Oct. 31, 1944.   A. BRAMHALL   2,361,677
TOILET SIGNAL DEVICE FOR TRAINING INFANTS
Filed Feb. 20, 1943
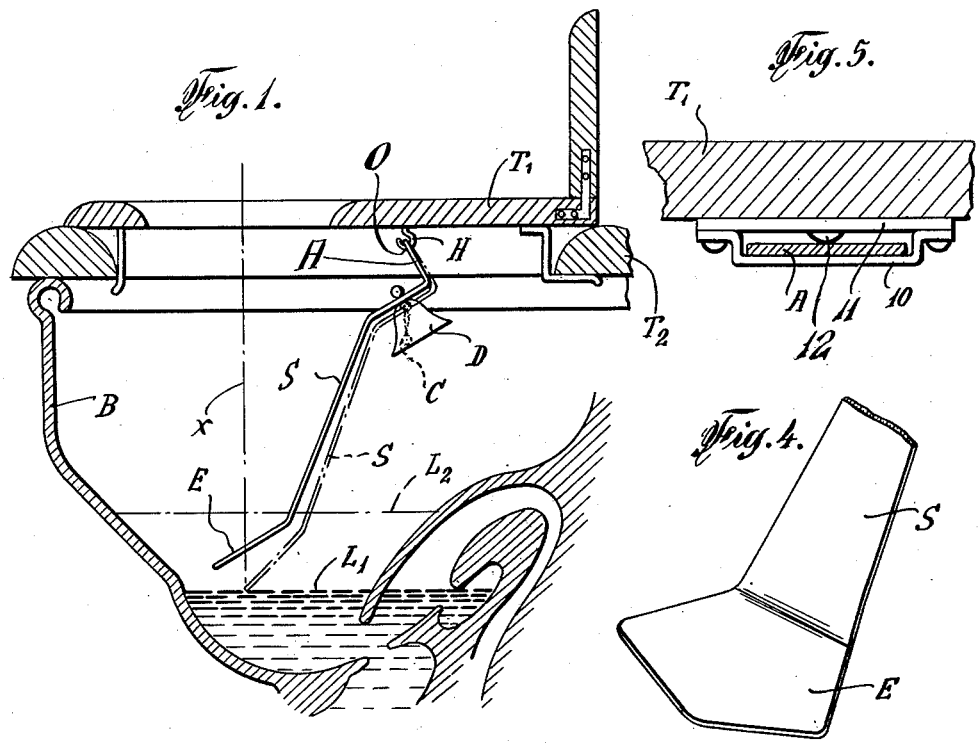
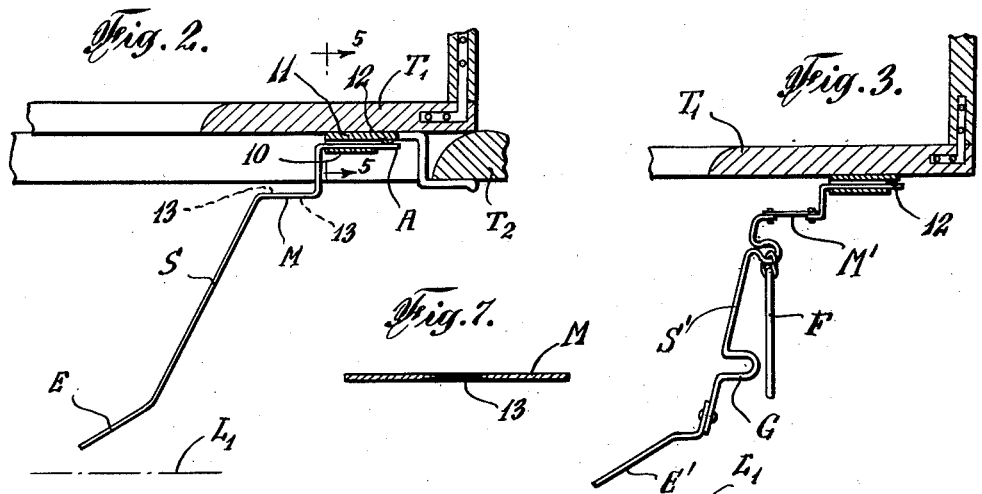
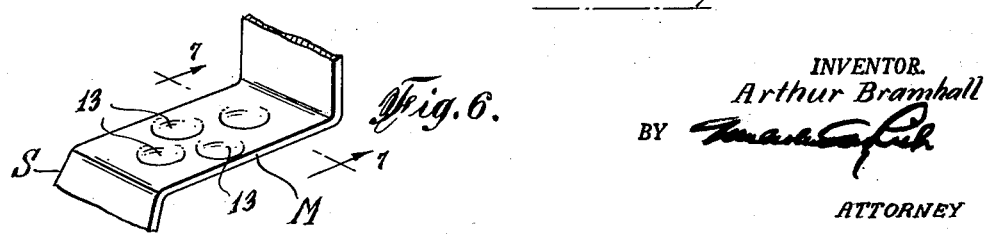
INVENTOR.
Arthur Bramhall
BY
ATTORNEY Patented Oct. 31, 1944

2,361,677

UNITED STATES PATENT OFFICE 2,361,677

TOILET SIGNAL DEVICE FOR TRAINING INFANTS

Arthur Bramhall, Livingston, N. J.

Application February 20, 1943, Serial No. 476,546

8 Claims. (Cl. 4—239)

This invention relates to toilet signaling devices and more specifically to a toilet signaling device that is particularly adapted for use in the bowel training of infants.

The training of infants to establish a regular bowel routine is exceedingly important and usually commences during the first year of its life, sometimes as early as six months. The training involves the placing of the infant at regular times each day upon the toilet seat and leaving the child on the seat until bowel evacuation has occurred. It usually takes considerable time to establish a regular bowel routine in a child which taxes the patience of both the child and the child's attendant. It is well recognized, however, that during the time interval that a child is seated on the toilet seat the attention of the child should not be diverted from the business at hand, such as by the attendant remaining in the room, or giving the child a toy to play with, or disturbing the child for inspection purposes. The continuance of these diversionary activities normally tends to prolong the training period. On the other hand, it is exceedingly important to remove the child promptly from the seat as soon as evacuation has occurred and some sort of a signaling means to inform the attendant of the act of evacuation is highly desirable. However, it is equally as important that the signaling means provided should be one that does not attract the attention of the child or cause the child to associate the signal with the act of evacuation as this might cause the child to strain itself unduly in an attempt to operate the signal means.

The primary object of the present invention is to provide a toilet signaling device for use in the bowl training of infants which is simple, inexpensive and easily mounted and demounted on a toilet seat and which is operative substantially instantaneously upon the performance of the act of evacuation to produce an audible signal of short duration and low intensity.

Another object is to provide a toilet signaling device of particular utility in the bowel training of infants.

Still another object is to provide a toilet signal-device responsive to bowel movements only which is adapted for use in the bowel training of infants.

Other objects and advantages will be apparent as the invention is more fully hereinafter disclosed.

In accordance with these objects, I have devised the toilet signaling device, the specific embodiments of which are illustrated in the accompanying drawing of which the following is a full and complete description.

In the drawing:

Fig. 1 illustrates one specific embodiment of the present invention;

Fig. 2 illustrates a second specific embodiment of the same;

Fig. 3 illustrates a third specific embodiment of the same;

Fig. 4 is an enlarged perspective view of one end of the device of Fig. 2 illustrating one feature of the device;

Fig. 5 is an enlarged sectional view along plane 5—5 of Fig. 2 illustrating one feature of the invention of Fig. 2;

Fig. 6 is an enlarged perspective view of a portion of the device of Fig. 2 illustrating a second feature of the same; and Fig. 7 is a sectional view taken along plane 7—7 of Fig. 6.

Referring first to the specific embodiment of the present invention shown in Fig. 1, the device consists of an elongated strip member S consisting of any suitable moldable material, such as any of the synthetic resins and plastics, for example "Lucite," metal, water-proofed wood or cellulosic material, etc., shaped substantially as indicated, one end A of which is provided with a hole or opening O adapting the member S to be dependingly sustained by hook H located in the rear under face of small toilet seat $T_1$ disposed upon the large or usual sized toilet seat $T_2$ on bowl B, the member S being shaped so as to provide for the pendulum suspension of clapper C of bell D closely adjacent the inside surface of bell D and for the location of the opposite end E of member S adjacent to but above the normal water level $L_1$ in bowl B but below the water flush level $L_2$ therein, and in a plane intercepting the normal path of fall X of stool from the seat $T_1$, but at an angle to the vertical axis of the path X so that the stool on striking end E of member S will in major part slide off the end E and deposit in the bottom of bowl B.

In this arrangement, the member S being pendulously hung from hook H will be urged downwardly and rearwardly upon the impact of the falling stool with the end E. This causes clapper C to come in contact with bell D producing a faint tinkle which is almost immediately terminated by the immersion of the tip end of end E in the water in the bottom of the bowl B which operates to cushion the movement of member S about the pendulum support provided by hook H engaging the hole O in end A.

After the removal of the child from seat T₁ and flushing the toilet bowl B, the end E is substantially cleaned of residual stool. If further cleaning is desired, however, the member S may be easily disconnected from hook H for this purpose.

Referring to Fig. 4, end E is preferably made relatively wide to insure stool interception.

Referring to Fig. 2, the arrangement shown is one wherein end A is detachably secured to the under surface of seat T₁ instead of being pendulously hung therefrom, in which case means such as flexible section M must be provided on member S in order to actuate the non-diversionary sound means provided. In this modification, in place of a bell means D, which can be mounted upon the non-flexing portion of member S in substantially the same manner shown in Fig. 1, I may employ a combination flexing and sound creating means which, per se, is old and well known in the art as "dimpled" or "crinkled" metal. This type of metal section M on being flexed produces a sharp, penetrating, snapping sound of relatively short duration.

Fig. 5 is a sectional view taken along plane 5—5 of Fig. 2 showing the details of the means to detachably secure the end A to seat T₁. As indicated, the means consists of a strap member 10 overlying a base 11 which is secured to the under face of seat T₁, the space gap between the strap 10 and base 11 providing a recess within which end A may be inserted in frictional engagement with the raised hemispherical section 12 on the base 11. There are many alternative arrangements possible without departing essentially from the present invention.

In Fig. 6 an enlarged perspective view illustrates the "dimpled" character of section M and in Fig. 7 a cross-section along plane 7—7 of Fig. 6 illustrates the structure of section M more particularly. From these two figures it is believed apparent that section M consists of a relatively thin strip of flexible, but relatively stiff, material provided with a plurality of hemispherical raised or depressed areas 13 which on being flexed reverse themselves with a sharp snap.

Referring to Fig. 3, the arrangement shown incorporates a chime and hammer means instead of a bell and clapper means such as is shown in Fig. 1. In this arrangement a chime pendant F is dependingly secured to elongated member S' adjacent to flexible section M' on the upper end thereof and a hammer extension G is located on the member S at a point along the length thereof adapted to permit the same to strike against the chime pendant F when the end E' is depressed downwardly and rearwardly by the falling stool. The arrangement shown contemplates the use of a plurality of parts secured together to form a unitary structure which is equivalent functionally to the arrangement of Fig. 2, except for the flexible section M' but equivalent functionally to the arrangement of Fig. 2 modified to include the bell means of the arrangement of Fig. 1 and substituting the flexible section M' for the flexible "dimpled" section M.

It is to be noted in each of the arrangements of Figs. 1, 2 and 3, the location of the end E at an angle to the path of fall of stool from seat T₁ and in relatively close spaced relation to the normal water level in bowl B effectively limits the extent to which the member S may be moved downwardly and rearwardly and provides means to limit the signal produced by each of the three means illustrated to a signal of short duration.

Each of the arrangements shown in Figs. 1, 2 and 3, also respond substantially simultaneously to the act of evacuation and produce a signal which, because of its short duration and low intensity, is substantially inaudible to the infant at the time of evacuation and unassociated by the infant with the act of evacuation, but of sufficient audibility to an attendant listening for the same at some distance from the toilet bowl and out of sight of the infant. This affords the opportunity for the attendant to reappear and to remove the child from the seat T₁ promptly following the act of evacuation with appropriate signs of approbation which the child can understand and appreciate with consequent beneficial effect upon the habit training of the child and a shortening of the time interval required to complete the training and to establish a regular bowel routine.

Having hereinabove described the present invention generically and specifically and given three specific embodiments of the same it is believed apparent that the invention may be widely modified without departing essentially therefrom and all such modifications and departures are contemplated as may fall within the scope of the following claims:

What I claim is

1. A toilet training device comprising an elongated member, means dependingly securing the member at one end to a toilet seat with the other or free end of the member sustained within the toilet bowl in intercepting position relative to the normal path of fall of stool from the toilet seat with the length of said member below the secured end free to move downwardly and rearwardly in response to stool interception by said free end and a signal means responsive to the said downward and rearward movement of said member to produce an audible signal of short duration and low intensity said signal means being carried by and forming a part of said member.

2. A toilet signal device, said device comprising an elongated member, means to dependingly secure the member at one end to a toilet seat with the other or free end thereof sustained within the toilet bowl in intercepting position relative to the normal path of fall of stool from the toilet seat with the length of the member between the secured end and the free end free to move downwardly and rearwardly in response to stool interception by said free end, and a signal means responsive to the downward and rearward movement of said member to produce an audible signal of short duration and low intensity dependingly secured to said member adjacent the secured end thereof but below the point of movement provided by the securing means.

3. A toilet signaling device, said device comprising an elongated member, means to dependingly and pendulously secure the said member at one end to a toilet seat with the other or free end of the member sustained within the toilet bowl in intercepting position relative to the normal path of fall of stool from the toilet seat and a signal means responsive to the pendulous movement of said member incident to stool interception by said free end, dependingly secured to the said member adjacent the secured end thereof.

4. The signaling device of claim 3, wherein said signaling means comprises a bell and clapper means, the said bell being dependingly secured to the said member at an angle to the vertical and the said clapper being pendulously hung with the free end thereof located in relatively close spaced relation to the inside surface of the bell.

5. The signaling means of claim 3, wherein the said elongated member comprises an elongated strip member having a broad end and a narrow end and wherein the said means to pendulously secure the said member comprises a hook member secured into the underface of said seat and a cooperating hole in the narrow end of said strip member adapted to engage the said hook member to pendulously sustain the said strip member therefrom, and wherein the length of the said strip member intermediate the broad and narrow ends thereof is shaped to locate the broad end of the said strip member when in rest position in intercepting position relative to the said path of fall of stool from the toilet seat at a downward angle to said path of fall to provide a downward and rearward pendulous movement to the said member incident to stool interception and wherein the said signal means is arranged to be responsive to said downward and rearward movement of said member to produce an audible sound of short duration and low intensity.

6. A toilet signaling device, said device comprising an elongated member, means to dependingly and resiliently secure one end of said member to a toilet seat with the other or free end of said member sustained within the toilet bowl in intercepting position relative to the normal path of fall of stool from the toilet seat and a signal means on said member adjacent the secured end thereof and responsive to the resilient movement of said member incident to stool interception by the free end thereof to produce an audible signal of short duration and low intensity.

7. The signaling device of claim 6, wherein said securing means comprises a relatively flexible section interposed between the secured end of said member and the means securing the said end to the toilet seat.

8. The signaling device of claim 6, wherein said securing means comprises a relatively flexible section interposed between the secured end of said member and the means securing the said end to the toilet-seat and wherein the said signal means is incorporated in and made a part of the said flexible section and is actuated by the flexing of said section to produce an audible signal of short duration and low intensity.

ARTHUR BRAMHALL.